United States Patent [19]

Reitz

[11] 4,439,807

[45] Mar. 27, 1984

[54] SECONDARY ARRESTER

[75] Inventor: Roderick Reitz, Berkshire, Mass.

[73] Assignee: General Electric Company

[21] Appl. No.: 409,238

[22] Filed: Aug. 18, 1982

[51] Int. Cl.³ .............................................. H02H 3/22

[52] U.S. Cl. ...................................... 361/127; 361/91; 361/119; 361/56

[58] Field of Search .................. 361/56, 91, 119, 127, 361/128; 338/21, 22 R

[56] References Cited

U.S. PATENT DOCUMENTS

| | | | |
|---|---|---|---|
| 3,693,053 | 9/1972 | Anderson | 361/56 X |
| 3,987,343 | 10/1976 | Cunningham et al. | 361/127 X |
| 4,282,557 | 8/1981 | Stetson | 361/128 X |
| 4,320,436 | 3/1982 | Bushnell | 361/127 X |
| 4,345,290 | 8/1982 | Johnson | 361/119 X |

*Primary Examiner*—Harry E. Moose, Jr.
*Attorney, Agent, or Firm*—Robert A. Cahill

[57] ABSTRACT

A voltage surge arrester utilizes a triangular shaped housing for accommodating up to three varistor elements respectively arranged on edge along the three planar sidewalls of the housing. The varistors are held in place by a resilient contact clip commonly engaging the inwardly faced varistor electrodes. Separate contact strips disposed between each varistor and the housing sidewalls engage the outwardly faced varistor electrodes. Line leads individually electrically connected with the contact strips and a ground lead electrically connected with the contact clip are brought out through an opening in the housing.

7 Claims, 11 Drawing Figures

SECONDARY ARRESTER

BACKGROUND OF THE INVENTION

The present invention relates to voltage surge arresters and particularly to a polyphase secondary arrester for protecting electrical equipment.

With the advent of sintered metal oxide varistors, particularly zinc oxide varistors, more complete protection of electrical equipment from the harmful consequences of voltage surges or transients is now possible. This is due to the exceptionally high nonlinear resistance characteristics of zinc oxide, which permits the elimination of spark gaps required of silicon carbide varistors commonly used in the past. Absent spark gaps, metal oxide varistors can be tailored to suppress lower levels of voltage surges which are nevertheless potentially damaging to electrical motors, appliances and the like. Moreover, the elimination of spark gaps significantly simplifies the design and manufacture of surge arresters.

It is accordingly an object of the present invention to provide an improved polyphase voltage surge arrester.

A further object is to provide a voltage surge arrester of the above character which is exceptionally compact in size.

An additional object is to provide a secondary voltage surge arrester of the above character which is efficient in design, convenient to manufacture and install, and reliable in service.

Other objects of the invention will in part be obvious and in part appear hereinafter.

SUMMARY OF THE INVENTION

In accordance with the present invention, there is provided an improved polyphase voltage surge arrester of exceptionally compact size and shape with a minimal number of internal parts for ease of fabrication and assembly. To this end, the arrester utilizes a triangular shaped housing molded in rigid, high impact-resistant plastic. A sintered metal oxide varistor disk is positioned on edge along each of the three planar sidewalls of the housing. Retaining the three varistor disks in place in a single electrically conductive spring clip which is centrally located in the housing and commonly engages the inwardly faced electrodes of all three varistors. Disposed between each varistor disk and its adjacent housing wall is a resilient, upstanding contact strip which is engaged with the outwardly faced varistor electrode. A ground lead and line leads are introduced through a sleeved opening in the base of the housing for electrical connection with the spring clip and the individual contact strips, respectively. The housing opening is plugged with a potting compound to inhibit the entry of moisture and other foreign matter. The open top of the housing is sealed with a cover which includes a weakened section designed to break away and relieve internal pressure occasioned by a failing varistor.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Corresponding reference numerals refer to like parts throughout the several views of the drawings.

DETAILED DESCRIPTION

Figure 1:
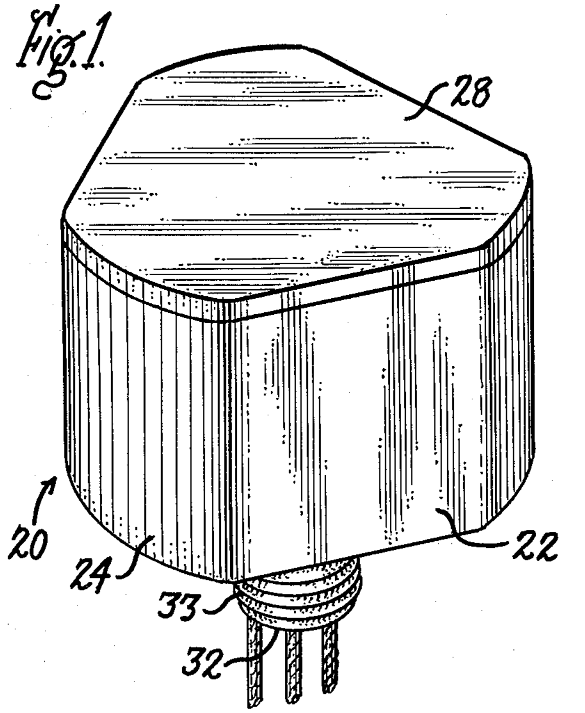
FIG. 1 is a perspective view of a voltage surge arrester constructed in accordance with the present invention.
Figure 2:
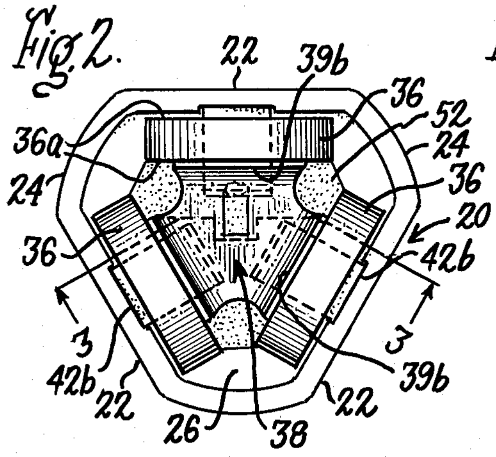
FIG. 2 is a plan view of the arrester of FIG. 1 with the housing cover removed.
Figure 3:
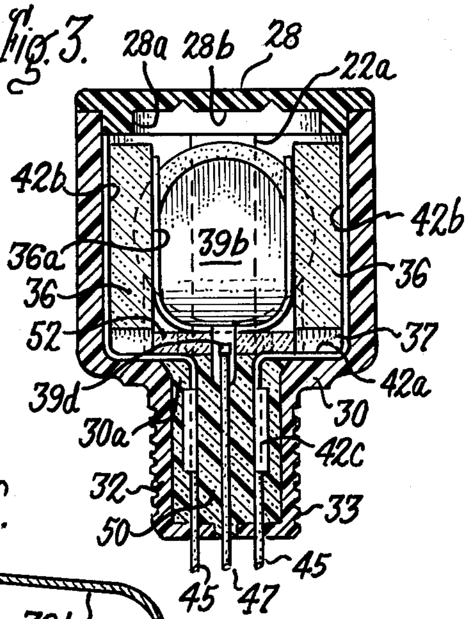
FIG. 3 is a sectional view taken along line 3—3 of FIG. 2.

The voltage surge arrester of the present invention utilizes, as seen in FIGS. 1 and 2, a generally triangular shaped housing, generally indicated at 20, molded of a rigid, high impact strength plastic and having three essentially planar sidewalls 22 integrally joined by curved corner segments 24. The housing sidewalls define a compartment 26 into which the arrester working components are assembled, after which the compartment is closed off by a conforming, triangular shaped top cover 28. As seen in FIG. 3, the cover, molded of the same material as housing 20, is formed with a depending, continuous rim **28*a* which closely fits inside the housing sidewalls and corner segments. The cover is secured in place by any suitable means, such as a compatible bonding agent or ultrasonic welding. As best seen in FIG. 3, the underside of the housing is provided with a floor 30 having a central opening 30*a* encompassed by an integral, depending sleeve 32 whose outer periphery is threaded, as indicated at 33**, to receive a locknut (not shown) facilitating arrester mounting upon installation.

Figure 4:
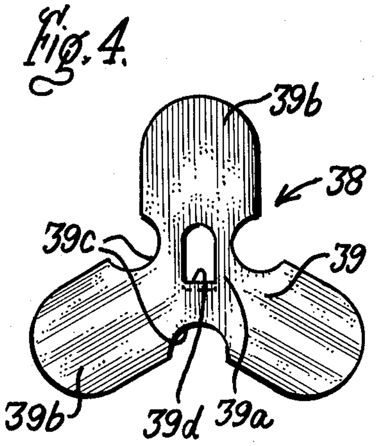
FIG. 4 is a plan view of the blank from which the contact spring clip seen in FIGS. 2 and 3 is formed.
Figure 5:
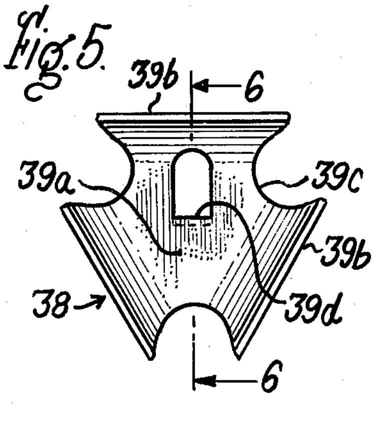
FIG. 5 is a plan view of the contact spring clip formed from the blank of FIG. 4.
Figure 6:
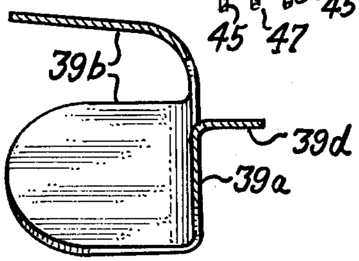
FIG. 6 is a sectional view taken along line 6—6 of FIG. 5.
Figure 9:
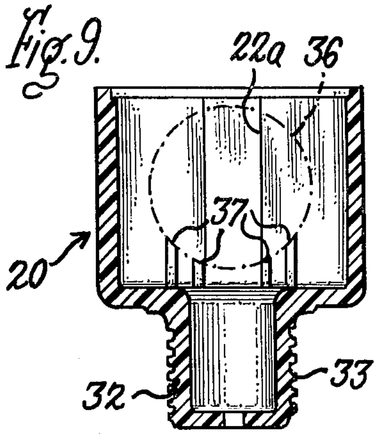
FIG. 9 is a sectional view taken along line 9—9 of FIG. 8.

As seen in FIGS. 2 and 3, accommodated within housing compartment 26 are three metal oxide varistor disks 36 arranged on edge and positioned along each of the planar sidewalls 22. Molded, internal ribs 37, seen in FIG. 9, outstanding from the lower portion of each planar sidewall, serve to seat the peripheral edges of the varistor disks. These disks consist of sintered bodies of zinc oxide plus known additives, with conductive coatings applied to their opposed faces to serve as electrodes **36*a*. Centrally disposed between the varistor disks is a contact spring clip, generally indicated at 38 and formed from a blank 39 of resilient electrically conductive metal seen in FIG. 4. Referring jointly to FIGS. 4 through 6, spring clip blank comprises a central portion 39*a* and three radiating contact fingers 39*a* arranged one hundred twenty degrees apart. The corners between the contact fingers are relieved, as indicated at 39*c*, to facilitate the contact fingers being deformed out of the plane of central portion 39***a* to essentially perpendicular positions thereto, as seen in FIGS. 5 and 6. Thus, when spring clip 38 is centrally positioned between varistor disks 36 (FIGS. 2 and 3), its contact fingers 39*b* engage and make electrical connection with the inwardly faced varistor contact terminals 36*a*. Moreover, the contact fingers bias the varistor disks outwardly toward the planar sidewalls 22 of the housing to effectively sustain the varistor positionings illustrated.

Figure 7:
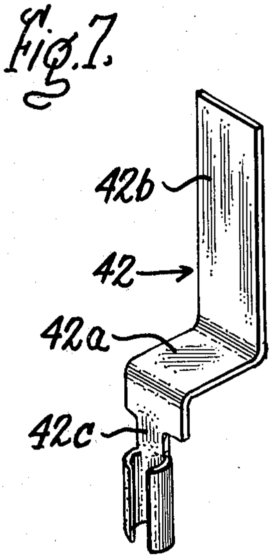
FIG. 7 is a perspective view of one of the resilient contact strips seen in FIGS. 2 and 3.

Interposed between each varistor disk and its adjacent planar housing sidewall is a contact strip, generally indicated at 42 and best seen in FIG. 7. These contact strips each include a horizontal bight portion 42*a* interconnecting an upstanding contact portions 42*b* and a depending connector portion 42*c*. As seen in FIG. 3, bight portion 42*a* of each contact strip rests on housing floor 30 with contact portion 42*b* extending upwardly between one of the varistors 36 and the adjacent planar housing sidewall 22. The connector portions 42*c* of the contact strips extend downwardly into housing sleeve 32. The middle two of the molded ribs 37 and a shallow vertical groove 22*a* molded into the interior surfaces of the planar sidewalls, seen in FIG. 9, serve to position the contact strips. The bias of spring contact clip 38 promotes electrical contacting engagement between the outwardly faced varistor electrodes and the contact portions 42*b* of the contact strips 42.

Figure 8:
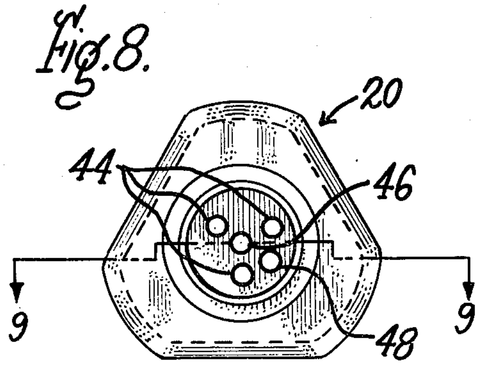
FIG. 8 is a bottom view of the housing for the arrester of FIG. 1.
Figure 11:
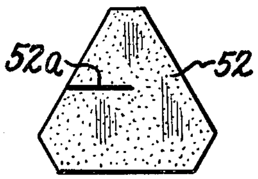
FIG. 11 is a plan view of a barrier element seen in FIG. 3 as being disposed over the bottom of the arrester housing.

As been seen in FIG. 8, the bottom end of sleeve 32 is closed off except for five holes. Of these, three holes 44 accommodate the egress of line leads 45 (FIG. 3) whose insulation-bared ends are individually electrically connected to the connector portions 42*c* of contact strips 42. The center hole 46 admits a ground lead 47 (FIG. 3) which is soldered or spot welded to a depending tab 39*d* struck from body portion 39*a* of spring clip blank 39 (FIG. 4). Alternatively, tab 39*d* may be omitted, and the end of ground lead 47 simply spot welded to the underside of spring clip body portion 39*a*. Finally, the fifth hole 48 in the sleeve end closing is for the purpose of admitting a potting compound 50 (FIG. 3) to fill the interior of sleeve 32 and thus preclude the entry of moisture and other foreign matter into varistor compartment 26, as well as to electrically isolate the lead terminations. To preclude the potting compound from entering the varistor compartment 26, a mat 52 (FIGS. 3 and 11) of suitable insulative material, such as a dense foam plastic, is laid across the bottom of varistor compartment 26 beneath contact spring clip 38. To provide clearance for ground lead 47 or tab 39*d*, mat 52 is slit, as indicated at 52*a* in FIG. 11.

Figure 10:
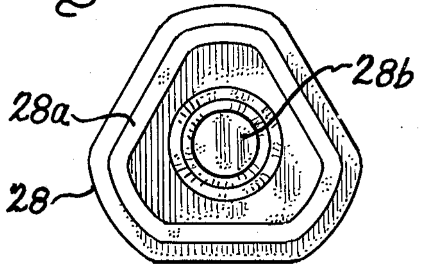
FIG. 10 is a plan view of the underside of the cover for the arrester housing.

To vent varistor compartment 26 in case of a pressure buildup due to a failing or failed varistor 36, cover 28 is molded with a weakened or blowout central section 28*b* seen in FIGS. 3 and 10.

While the foregoing description has been directed to a three-pole arrester, it will be appreciated that same construction is adaptable to two and single-pole arresters simply by substituting disk blanks for the varistor disks illustrated in the drawings.

It will thus be seen that the objects set forth above, including those made apparent in the preceding description, are efficiently attained and, since certain changes may be made in the above construction without departing from the scope of the invention, it is intended that all matter contained in the above description or disclosed in the accompanying drawings shall be interpreted as illustrative and not in a limiting sense.

Having described the invention, what is claimed as new and desired to secure by Letters Patent is:

1. A voltage surge arrester comprising, in combination:

A. a triangular shaped, insulative housing having three integrally interconnected sidewalls defining a compartment;
B. means for establishing an edgewise varistor mounting position in said compartment along each said sidewall;
C. a metal oxide varistor disposed in at least one of said mounting positions, said varistor having a disk-shaped body with electrodes applied to opposed faces thereof;
D. an electrically conductive spring clip centrally located within said compartment, said spring clip having a body portion with three angularly spaced contact fingers outstanding therefrom, said contact fingers being resiliently biased toward said mounting positions for electrically contacting engagement with the inwardly faced electrodes of any varistors disposed therein;
E. separate contact strips located between said planar sidewalls and those of said mounting positions occupied by a varistor for electrically contacting engagement with the outwardly faced electrodes thereof; and
F. separate leads admitted into said housing and electrically connected to said spring clip and to each of said contact strips.

2. The surge arrester defined in claim 1, wherein said establishing means includes ribs formed with each said planar sidewall for seating the peripheral edges of said varistor bodies.

3. The surge arrester defined in claim 1, wherein said housing further includes a sleeve encompassing an opening into said compartment, said leads being admitted through said sleeve.

4. The surge arrester defined in claim 3, which further includes a potting compound injected into said sleeve to isolate the electrical connections of said leads with said spring clip and said contact strips.

5. The surge arrester defined in claim 4, which further includes a barrier positioned over said compartment opening to exclude said potting compound from said compartment.

6. The surge arrester defined in claim 1, which further includes a cover sealing of an open end of said housing.

7. The surge arrester defined in claim 6 wherein said cover includes a weakened section designed to blow out and relieve a high pressure condition within said compartment.

* * * * *